US009639622B2

(12) United States Patent
Ishida

(10) Patent No.: US 9,639,622 B2
(45) Date of Patent: May 2, 2017

(54) IMAGE PROCESSING SYSTEM, IMAGE PROCESSING METHOD, PROGRAM, AND NON-TRANSITORY INFORMATION STORAGE MEDIUM

(75) Inventor: Takayuki Ishida, Tokyo (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 321 days.

(21) Appl. No.: 13/555,474

(22) Filed: Jul. 23, 2012

(65) Prior Publication Data

US 2013/0041898 A1 Feb. 14, 2013

(30) Foreign Application Priority Data

Aug. 10, 2011 (JP) ................................. 2011-175136

(51) Int. Cl.
*G06F 17/00* (2006.01)
*G06F 17/30* (2006.01)

(52) U.S. Cl.
CPC ................................ *G06F 17/3089* (2013.01)

(58) Field of Classification Search
CPC ............. G06F 17/3053; G06F 17/3089; G06F 3/3089; G06F 19/321; G06F 19/3406; G06F 3/048; G06F 3/0482; G06F 3/1203
USPC ........................................................ 707/736
See application file for complete search history.

(56) References Cited

U.S. PATENT DOCUMENTS

| 7,991,841 | B2 * | 8/2011 | Anderson et al. ............. 709/205 |
| 8,060,463 | B1 * | 11/2011 | Spiegel ......................... 707/609 |
| 8,380,709 | B1 * | 2/2013 | Diller et al. .................. 707/723 |
| 8,498,990 | B2 * | 7/2013 | Heber ........................... 707/748 |
| 2005/0004889 | A1 * | 1/2005 | Bailey et al. ...................... 707/1 |
| 2006/0059143 | A1 * | 3/2006 | Palmon ............. G06F 17/30286 |
| 2006/0059225 | A1 * | 3/2006 | Stonehocker ..... G06F 17/30884 709/202 |
| 2007/0162459 | A1 * | 7/2007 | Desai ................ G06F 17/30864 |
| 2007/0208730 | A1 * | 9/2007 | Agichtein et al. ................ 707/5 |
| 2008/0005072 | A1 * | 1/2008 | Meek ................ G06F 17/30867 |
| 2011/0196861 | A1 * | 8/2011 | Egnor et al. ................... 707/723 |
| 2011/0270965 | A1 * | 11/2011 | Poblete et al. ................. 709/224 |
| 2012/0005203 | A1 * | 1/2012 | Brzozowski et al. ........ 707/732 |
| 2012/0072572 | A1 * | 3/2012 | Bladel ........................... 709/224 |
| 2012/0226701 | A1 * | 9/2012 | Singh ............................. 707/748 |
| 2012/0253942 | A1 * | 10/2012 | Garfinkle ........... G06Q 30/0269 705/14.66 |

* cited by examiner

*Primary Examiner* — Truong Vo
(74) *Attorney, Agent, or Firm* — Matthew B. Dernier, Esq.

(57) ABSTRACT

A web site determination unit determines web sites associated with any one of a plurality of users of interest. A web site association unit associates, among the determined web sites, a plurality of the web sites with each other, each of the plurality of the web sites satisfying at least one of a condition on a feature amount of the each of the plurality of the web sites and a condition on at least one of the users of interest associated with the each of the plurality of the web sites. Accordingly, web site groups possibly having a commonality may be determined among web site groups associated with users of interest.

10 Claims, 13 Drawing Sheets

FIG.4

| CORRESPONDENCE MANAGEMENT ID | 0011 |
|---|---|
| SEED DATA | INCLUDING "RAMEN" |
| Y EVALUATION SCORE | 0 |
| N EVALUATION SCORE | 0 |

| USER-OF-INTEREST ID | USER SCORE | Y EVALUATION SCORE | N EVALUATION SCORE |
|---|---|---|---|
| musashi | | 0 | 0 |
| samurai | | 0 | 0 |
| | | | |

| URL OF INTEREST | WEB SITE SCORE | Y EVALUATION SCORE | N EVALUATION SCORE |
|---|---|---|---|

| CORRESPONDENCE MANAGEMENT ID | 0011 |
|---|---|
| SEED DATA | INCLUDING "RAMEN" |
| Y EVALUATION SCORE | 0 |
| N EVALUATION SCORE | 0 |

| USER-OF-INTEREST ID | USER SCORE | Y EVALUATION SCORE | N EVALUATION SCORE |
|---|---|---|---|
| musashi | | 0 | 0 |
| samurai | | 0 | 0 |

| URL OF INTEREST | WEB SITE SCORE | Y EVALUATION SCORE | N EVALUATION SCORE |
|---|---|---|---|
| http://a1b1/··· | 450 | 0 | 0 |
| http://c2d2/··· | 600 | 0 | 0 |

| CORRESPONDENCE MANAGEMENT ID | 0011 |
|---|---|
| SEED DATA | INCLUDING "RAMEN" |
| Y EVALUATION SCORE | 0 |
| N EVALUATION SCORE | 0 |

| USER-OF-INTEREST ID | USER SCORE | Y EVALUATION SCORE | N EVALUATION SCORE |
|---|---|---|---|
| musashi | 1000 | 0 | 0 |
| benkei | 800 | 0 | 0 |
| | | | |

| URL OF INTEREST | WEB SITE SCORE | Y EVALUATION SCORE | N EVALUATION SCORE |
|---|---|---|---|
| http://a1b1/··· | 450 | 0 | 0 |
| http://c2d2/··· | 600 | 0 | 0 |
| | | | |

| CORRESPONDENCE MANAGEMENT ID | 0011 |
|---|---|
| SEED DATA | INCLUDING "RAMEN" |
| Y EVALUATION SCORE | 0 |
| N EVALUATION SCORE | 0 |

| USER-OF-INTEREST ID | USER SCORE | Y EVALUATION SCORE | N EVALUATION SCORE |
|---|---|---|---|
| musashi | 1000 | 0 | 0 |
| benkei | 800 | 0 | 0 |
|  |  |  |  |

| URL OF INTEREST | WEB SITE SCORE | Y EVALUATION SCORE | N EVALUATION SCORE |
|---|---|---|---|
| http://e3f3/... | 850 | 0 | 0 |
| http://c2d2/... | 650 | 0 | 0 |
|  |  |  |  |

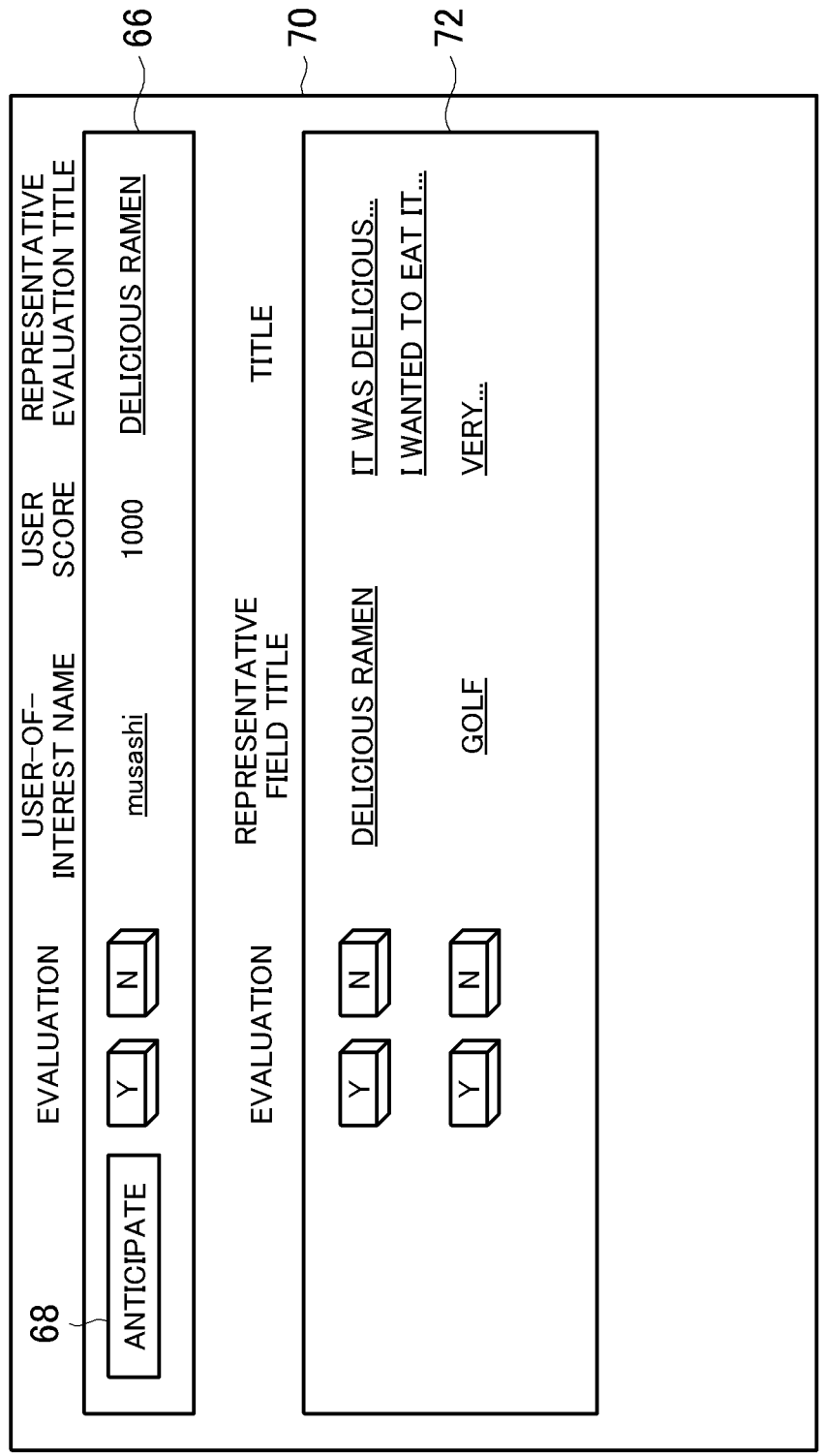

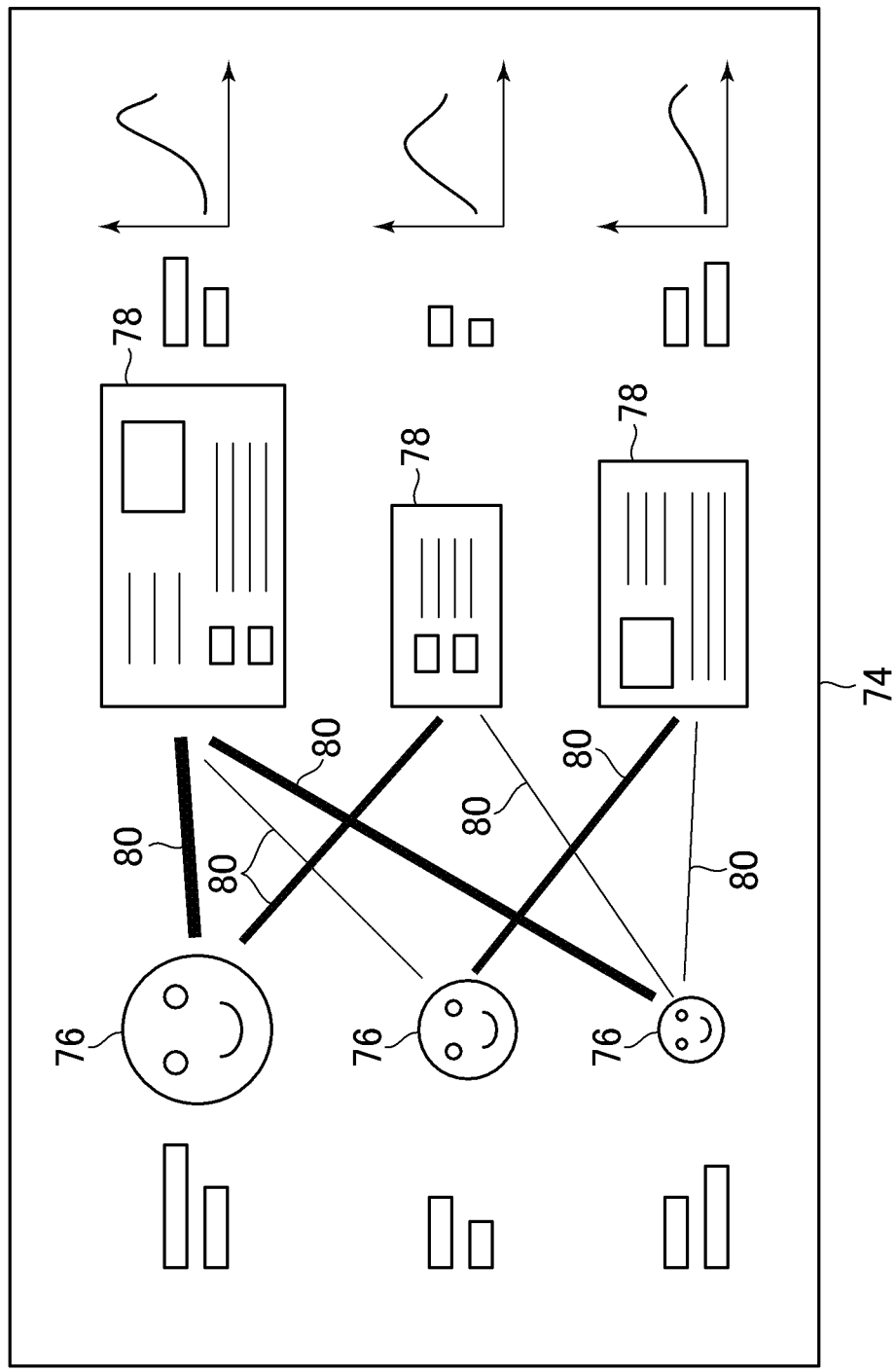

IMAGE PROCESSING SYSTEM, IMAGE PROCESSING METHOD, PROGRAM, AND NON-TRANSITORY INFORMATION STORAGE MEDIUM

CROSS-REFERENCE TO RELATED APPLICATION

The present application claims priority from Japanese application JP 2011-175136 filed on Aug. 10, 2011, the content of which is hereby incorporated by reference into this application.

BACKGROUND OF THE INVENTION

1. Field of the Invention

The present invention relates to an information processing system, an information processing method, a program, and a non-transitory information storage medium.

2. Description of the Related Art

There are various analysis technologies relating to a web site, such as an analysis technology for the number of accesses to the web site (e.g., determining the number of accesses for each time of day) and an analysis technology for a keyword used for searching for the web site (e.g., determining a keyword frequently used for searching).

SUMMARY OF THE INVENTION

In a web site associated with a user of interest as an analysis target (hereinafter, referred to as "user of interest") (e.g., web site at a location indicated by a uniform resource locator (URL) written in a blog article or a comment posted by a user of interest), a content in which the user of interest is interested may be written. There may be a certain commonality among web site groups which are determined among web site groups associated with a certain user of interest and satisfy at least one of conditions on the feature amount of the web site and the user of interest associated with the web site (e.g., web site group where the number of associated users of interest is equal to or larger than a predetermined number, or web site group where a ratio of the number of associated users of interest to the total number of users of interest is equal to or larger than a predetermined value).

Therefore, as long as web site groups which satisfy one of the conditions on the feature amount of the web site and the user of interest associated with the web site can be determined among the web site groups associated with a certain user of interest, it is expected that various analysis can be carried out by using the determined result, for example, analysis of a topic which is of common interest to or hot among the users of interest, or analysis of a possible future trend.

The present invention has been made in view of the above-mentioned circumstances, and an object of some embodiments of the invention is to enable determination of, among web site groups associated with users of interest, web site groups possibly having a commonality.

In order to attain the above-mentioned object, according to an exemplary embodiment of the present invention, there is provided an information processing system, including: a web site determination unit that determines web sites associated with any one of a plurality of users of interest; and a web site association unit that associates, among the determined web sites, a plurality of the web sites with each other, each of the plurality of the web sites satisfying at least one of a condition on a feature amount of the each of the plurality of the web sites and a condition on at least one of the plurality of users of interest associated with the each of the plurality of the web sites.

Further, according to an exemplary embodiment of the present invention, there is provided an information processing method, including: determining web sites associated with any one of a plurality of users of interest; and associating, among the determined web sites, a plurality of the web sites with each other, each of the plurality of the web sites satisfying at least one of a condition on a feature amount of the each of the plurality of the web sites and a condition on at least one of the plurality of users of interest associated with the each of the plurality of the web sites.

Further, according to an exemplary embodiment of the present invention, there is provided a program stored in a non-transitory computer readable information storage medium, which is to be executed by a computer, the program including instructions to: determine web sites associated with any one of a plurality of users of interest; and associate, among the determined web sites, a plurality of the web sites with each other, each of the plurality of the web sites satisfying at least one of a condition on a feature amount of the each of the plurality of the web sites and a condition on at least one of the plurality of users of interest associated with the each of the plurality of the web sites.

Further, according to an exemplary embodiment of the present invention, there is provided a non-transitory computer readable information storage medium storing a program which is to be executed by a computer, the program including instructions to: determine web sites associated with any one of a plurality of users of interest; and associate, among the determined web sites, a plurality of the web sites with each other, each of the plurality of the web sites satisfying at least one of a condition on a feature amount of the each of the plurality of the web sites and a condition on at least one of the plurality of users of interest associated with the each of the plurality of the web sites.

According to the exemplary embodiments of the present invention, among the web sites associated with any one of the plurality of users of interest, the plurality of web sites which satisfy at least one of the conditions on the feature amount of the web site and the user of interest associated with the web site are associated with each other. As a result, among web site groups associated with the users of interest, web site groups possibly having a commonality can be determined.

According to the exemplary embodiment of the present invention, the web site association unit associates a plurality of the web sites with each other, each of the plurality of the web sites satisfying a condition on a number of the users of interest associated with the each of the plurality of the web sites.

Further, according to the exemplary embodiment of the present invention, the web site association unit associates a plurality of the web sites with each other, each of the plurality of the web sites having the number of the users of interest associated with the each of the plurality of the web sites which is equal to or larger than a predetermined number.

Further, according to the exemplary embodiment of the present invention, the web site association unit associates a plurality of the web sites with each other, each of the plurality of the web sites having a ratio of the number of the users of interest associated with the each of the plurality of the web sites to a total number of the users of interest which is equal to or larger than a predetermined value.

Further, according to the exemplary embodiment of the present invention, the information processing system further includes a user determination unit that determines, among users associated with any one of the plurality of the web sites associated with each other by the web site association unit, a user who satisfies a condition on a feature amount of the user.

Further, according to the exemplary embodiment of the present invention, the information processing system further includes a user determination unit that determines at least a part of users associated with anyone of the plurality of the web sites associated with each other by the web site association unit as a user of interest to be added, the web site determination unit determines a web site associated with any one of the users of interest including the at least the part of users determined as the user of interest to be added; and further includes a web site de-association unit that de-associates a web site no longer satisfying the at least one of the conditions and a web site associated with the web site.

Further, according to the exemplary embodiment of the present invention, the web site association unit associates a plurality of the web sites with each other, each of the plurality of the web sites satisfying a condition on one of a number of accesses to a web page on which a URL of the each of the plurality of the web sites has been written and an increasing tendency of the number of accesses to the web page on which the URL of the each of the plurality of the web sites has been written.

Further, according to another exemplary embodiment of the present invention, there is provided an information processing system, including: an information generation unit that generates information to be provided including information corresponding to each of a plurality of users of interest, information corresponding to each of a plurality of web sites of interest, and information indicating strength of a relationship between the each of the plurality of users of interest and the each of the plurality of web sites of interest; and an information output unit that outputs the information to be provided, in which: the each of the plurality of web sites of interest is a web site associated with information registered by any one of the plurality of users of interest; and the information generation unit generates the information to be provided so that the information indicating the strength of the relationship between the user of interest and the web site of interest is displayed in a manner in accordance with the information relating to the web site of interest, the information being registered by the user of interest.

The "web site" as used in the present invention, which is a concept including digital contents or a general set of digital contents made public in the computer network such as the Internet, is not limited to the web page (e.g., the "web site" as used in the present invention is not limited to one or a plurality of web pages corresponding to a URL started with "http://" or one or a plurality of web pages to be accessed by Hypertext Transfer Protocol (HTTP) protocol).

BRIEF DESCRIPTION OF THE DRAWINGS

In the accompanying drawings:

FIG. 4 illustrates an example of correspondence management data;

FIG. 5 illustrates an example of the correspondence management data;

FIG. 6 illustrates an example of the correspondence management data;

FIG. 7 illustrates an example of the correspondence management data;

FIG. 8 illustrates an example of a field list page;

FIG. 12 illustrates an example of a detailed user-of-interest page; and

FIG. 13 illustrates an example of a correspondence display page.

DETAILED DESCRIPTION OF THE INVENTION

Figure 1:
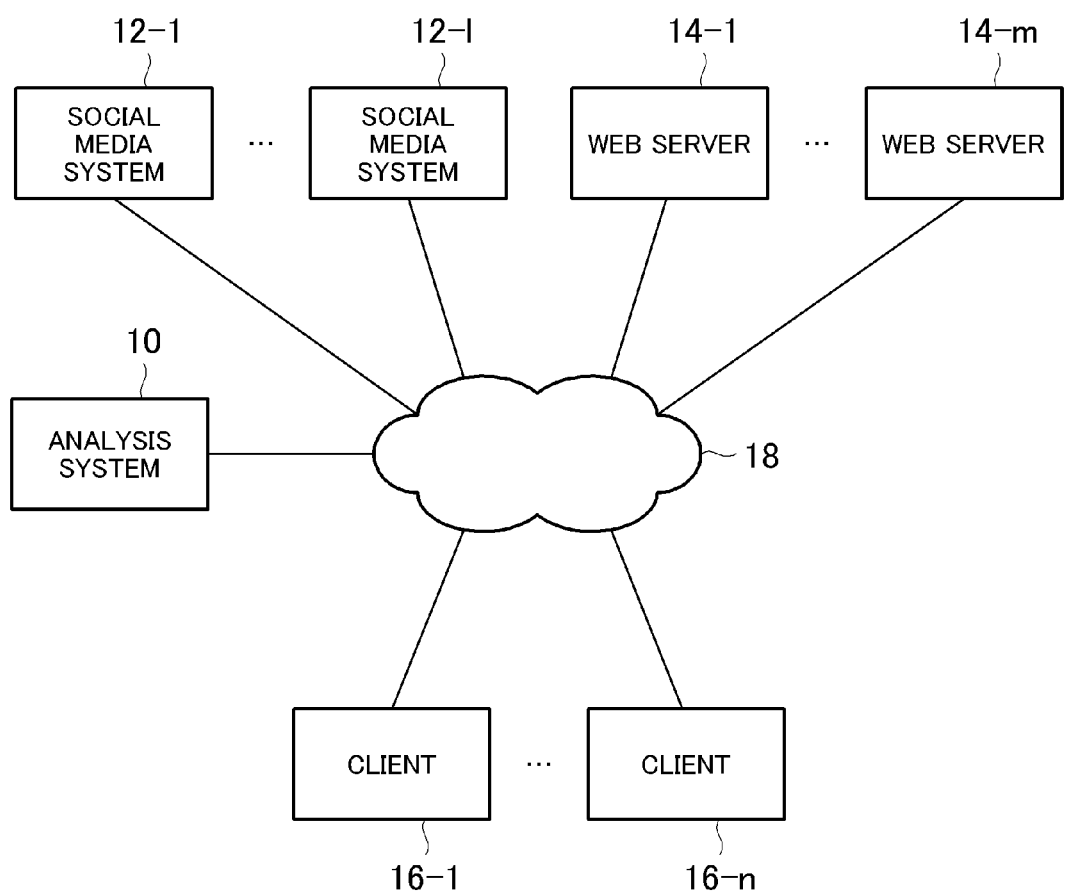
FIG. 1 illustrates an overall configuration of a computer network according to an embodiment of the present invention.

Hereinafter, an embodiment of the present invention is described in detail below referring to the drawings.

FIG. 1 is a diagram illustrating an overall configuration of a computer network 18 according to the embodiment of the present invention. As illustrated in FIG. 1, an analysis system 10, social media systems 12 (12-1 to 12-1), web servers 14 (14-1 to 14-$m$), and clients 16 (16-1 to 16-$n$), which are all constructed based on computers, are connected to the computer network 18 such as the Internet. The analysis system 10, the social media systems 12, the web servers 14, and the client 16 can communicate to/from one another.

The analysis system 10, which is a computer system such as a server functioning as an information processing system according to this embodiment, analyzes data registered in the social media system 12. The social media system 12 is, for example, a computer system such as a server that provides services of making public a content received from a user. As services provided from the social media system 12, for example, there are an electronic bulletin board, a blog, a wiki, a social bookmark, Twitter (registered trademark), and a social network service. According to this embodiment, the social media systems 12 provide different services to the user. The web server 14 is a server that provides contents such as a web page to the client 16.

Each of the analysis system 10, the social media system 12, and the web server 14 includes, for example, a control unit that is a program control device such as a central processing unit (CPU) which operates in accordance with a program installed in the own device, a storage unit that is a storage element such as a read-only memory (ROM) or a random access memory (RAM), or a hard disk drive, and a communication unit that is a communication interface such as a network board. Those elements are interconnected to each other via a bus. The storage units of the analysis system 10, the social media system 12, and the web server 14 store programs executed by the control units of the own devices. The storage units of the analysis system 10, the social media system 12, and the web server 14 also operate as work memories of the own devices.

The client 16, which is a computer utilized by a user of the analysis system 10 or the social media system 12, is, for example, a personal computer, a game console, a television set, a portable game device, or a portable information terminal. The client 16 includes, for example, a control unit such as a CPU, a storage unit such as a storage element including a ROM or a RAM, or a hard disk drive, an output unit such as a display or a speaker, an input unit such as a game controller, a touch pad, a mouse, a keyboard, or a microphone, a communication unit such as a network board, and an optical disc drive unit that reads data from an optical disc (computer readable information storage medium) such as a digital versatile disc (DVD)-ROM or Blu-ray (registered trademark) disc.

The client 16 of this embodiment has a web browser installed therein in advance. According to this embodiment, the client 16 accesses the analysis system 10 through the web browser, and inputs a user ID and a password, which are registered in the analysis system 10 to log in. Then, when the client 16 accesses a predetermined URL, a screen corresponding to the predetermined URL is displayed on the display of the client 16. Further, according to this embodiment, the client 16 accesses the social media system 12 through the web browser, and inputs a user ID and a password of the user registered in the social media system 12. Then, when the client 16 accesses a predetermined URL, a screen corresponding to the predetermined URL is displayed on the display of the client 16. In the analysis system 10 and the social media system 12, after the entry of the user ID and the password, for example, by referring to a session ID, the user ID of the user who utilizes the client 16 can be determined.

The social media system 12 according to this embodiment can receive a posted content such as a blog article or a comment from the client 16. The posted content is stored in the storage unit included in the social media system 12. Then, in response to a request from the client 16, the social media system 12 transmits the posted content to the client 16. The client 16 that has received the content displays/outputs the content on/to the display. Thus, the content posted by the user can be made public.

Figure 2:
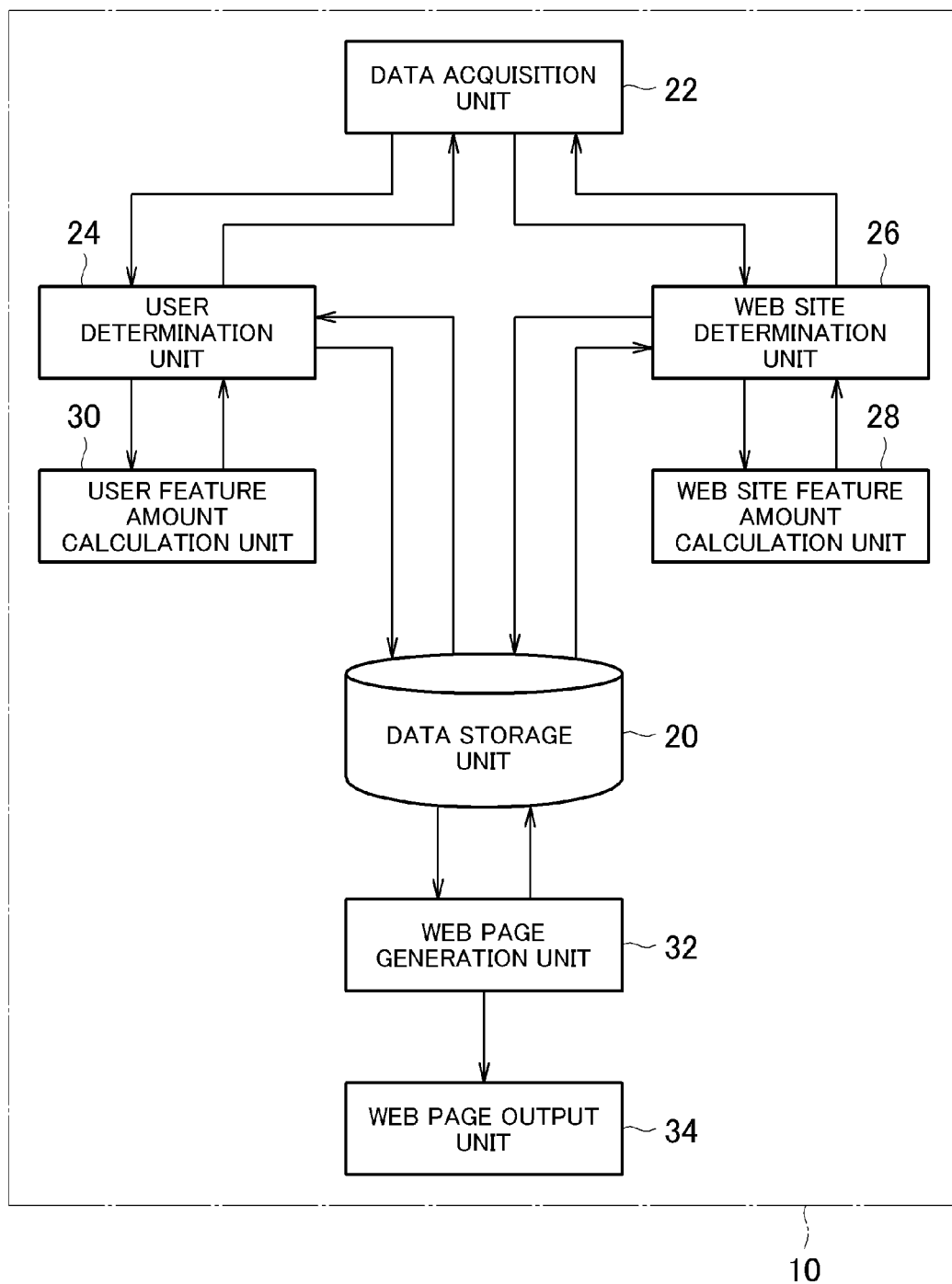
FIG. 2 is a functional block diagram illustrating an example of functions implemented by an analysis system according to the embodiment of the present invention.

FIG. 2 is a functional block diagram illustrating an example of functions implemented by the analysis system 10 of this embodiment. As illustrated in FIG. 2, the analysis system 10 functionally includes a data storage unit 20, a data acquisition unit 22, a user determination unit 24, a web site determination unit 26, a web site feature amount calculation unit 28, a user feature amount calculation unit 30, a web page generation unit 32, and a web page output unit 34. The data storage unit 20 is implemented mainly by the storage unit included in the analysis system 10. The other elements are implemented mainly by the control unit included in the analysis system 10.

Those functions are implemented by executing a program of this embodiment in the analysis system 10 that is a computer. This program may be downloaded from another computer via a communication interface through a computer communication network, or may be stored in a computer readable information storage medium such as an optical disc (e.g., compact disc (CD)-ROM, DVD-ROM, or Blu-ray disc) or a universal serial bus (USB) memory, and then installed in the analysis system 10 via an optical disc drive or a USB port.

Figure 3:
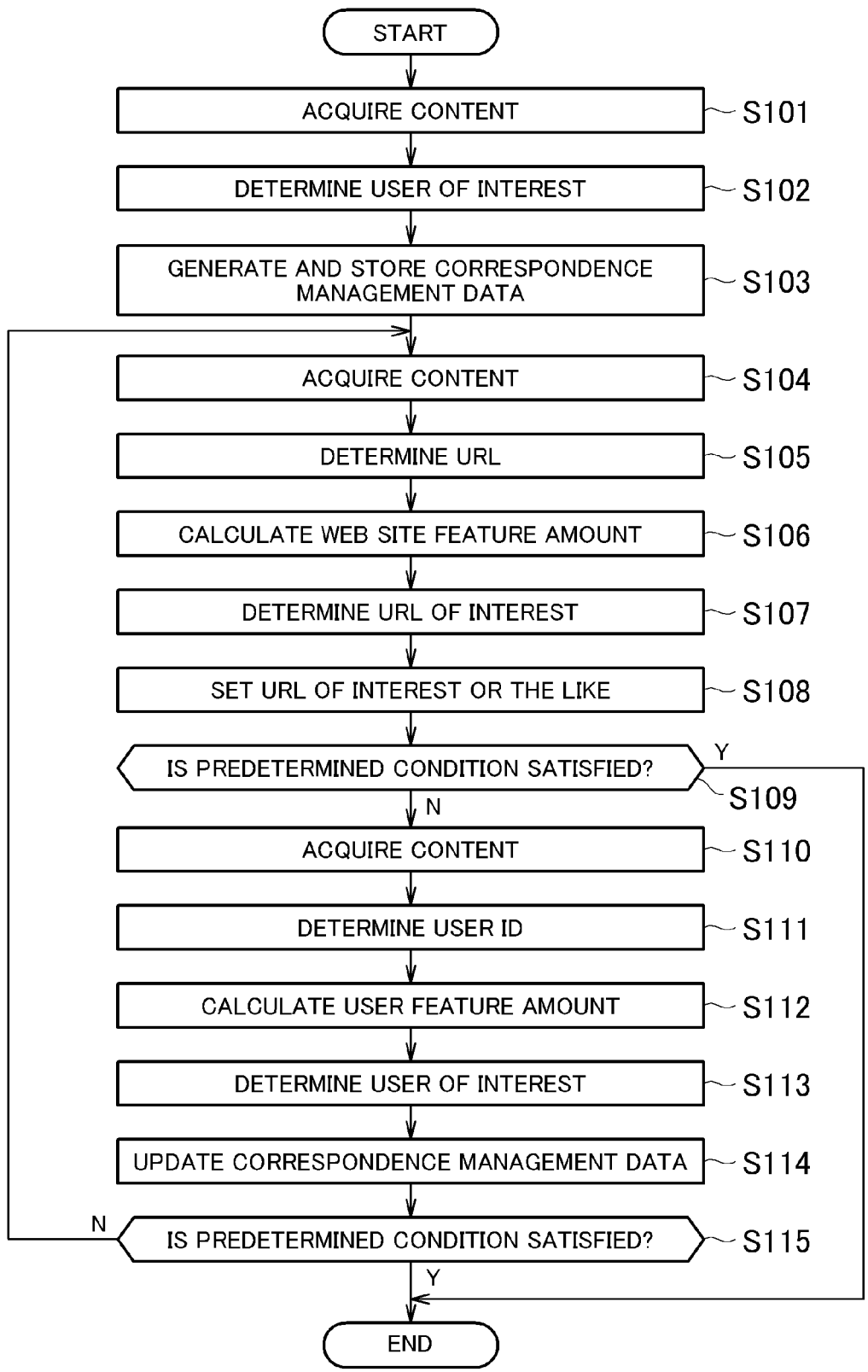
FIG. 3 is a flowchart illustrating an example of a flow of processing performed in the analysis system according to the embodiment of the present invention.

The analysis system 10 according to this embodiment executes, based on the content such as a blog article or a comment registered in the social media system 12, analysis processing on association between the user and the web site. An example of a flow of the analysis processing executed by the analysis system 10 of this embodiment is now described referring to a flowchart of FIG. 3. In this embodiment, it is presumed that a plurality of seed data pieces indicating different conditions for acquisition of data (e.g., condition that the content is included in a web page at a location indicated by a URL indicated by the seed data or condition that the content includes a keyword indicated by the seed data) have been stored in advance in the data storage unit 20. According to this embodiment, processes described below respectively based on the plurality of seed data pieces are executed in parallel.

First, in Step S101, the data acquisition unit 22 acquires a content satisfying the condition indicated by the seed data (e.g., content included in the web page at the location indicated by the URL indicated by the seed data or content including the keyword indicated by the seed data) from the social media system 12. In this processing example, for example, a user ID that is an identifier of the user who has posted the content and a posting date/time of posting the content are associated with the content thus acquired.

In Step S102, the user determination unit 24 determines the user identified by the user ID associated with the content acquired in Step S101 as a user of interest. In this processing example, it is presumed that a plurality of users have been determined as users of interest. In Step S103, the user determination unit 24 generates correspondence management data 40 illustrated in FIG. 4 to store the correspondence management data 40 in the data storage unit 20.

The correspondence management data 40, which manages association between the user and the web site, includes, for example, as illustrated in FIG. 4, a correspondence management ID that is an identifier of the correspondence management data 40, the above-mentioned seed data, a Y evaluation score corresponding to the correspondence management data 40, an N evaluation score corresponding to the correspondence management data 40, a user-of-interest ID that is a user ID of the user of interest determined in Step S102, and a URL of interest determined in processing described below. A plurality of user-of-interest IDs may be included in the correspondence management data 40, or a value of the user-of-interest ID included in the correspondence management data 40 may be null. A plurality of URLs of interest may be included in the correspondence management data 40, or a value of the URL of interest included in the correspondence management data 40 may be null. A user score, a Y evaluation score corresponding to the user-of-interest ID, and an N evaluation score corresponding to the user-of-interest ID are associated with the user-of-interest ID. A web site score, a Y evaluation score corresponding to the URL of interest, and an N evaluation score corresponding to the URL of interest are associated with the URL-of-interest ID. The user score, the web site score, the Y evaluation score, and the N evaluation score are described below in detail. In the correspondence management data 40 generated in Step S103, values of the URL of interest, the user score, and the web site score are null, and initial values (0 in this embodiment) are set as the Y evaluation score and the N evaluation score. FIG. 4 illustrates an example of the correspondence management data 40 at the end time of Step S103. As illustrated in FIG. 4, the users of interest are associated with each other by the correspondence management data 40.

Then, in Step S104, the data acquisition unit 22 acquires a content (blog article or comment) posted by any one of the determined users of interest from the social media system 12. In this processing example, the data acquisition unit 22 acquires contents from the plurality of social media systems 12 in Step S104. In Step S105, the web site determination unit 26 determines URLs included in the contents acquired in Step S104. In this processing example, a plurality of URLs are determined. In Step S105, for example, URLs described as a part of the blog article or the comment by the user are determined. The URLs thus determined are each associated with a web site (including at least one web page in this embodiment) at a location indicated by each of the URLs. In other words, in Step S105, the web site determination unit 26 determines the web site associated with each of the URLs included in the contents acquired in Step S104. The web site at the location indicated by each of the URLs may be provided from the social media system 12 or the web server 14.

In Step S106, the web site feature amount calculation unit 28 calculates a feature amount corresponding to each URL determined in Step S105 (i.e., feature amount corresponding to the web site). Hereinafter, the feature amount thus calculated is referred to as a web site feature amount. According to this embodiment, the web site feature amount calculation unit 28 calculates a value obtained by multiplying values of a plurality of parameters by given weighting coefficients to total the multiplied values as a score indicating the feature amount (in this processing example, referred to as a web site score). The web site feature amount calculation unit 28 may calculate, for example, a vector whose components are the values of the plurality of parameters as a web site feature amount.

Parameters that are bases for calculating a web site score corresponding to a URL include, for example: (1) number of users of interest who have written the URL as a part of a content; (2) ratio of users of interest who have written the URL as the part of the content to the total number of users of interest; (3) number of contents including the URL; (4) number of users who have posted blog articles or comments including the URL, or set bookmarks for the URL; (5) average number of links included in the contents including the URL; (6) number of links in the same hashtag in a web page of Twitter including the URL as a part of the content; (7) number of the same tag bookmarks in the same user in a web page of a social bookmark service including the URL as a part of the content; (8) average value of user's average posting time interval for all the users; (9) average value of the average numbers of contents among contents posted by the users for all the users; (10) recent number of accesses to the web page on which the URL has been written, an increase amount of the number of accesses, or an increase rate of the number of accesses; (11) similarity between a base URL of the web page on which the URL has been written and a main portion or all texts of the web page, which can be calculated by a full-text search engine, for example; (12) ratio of inclusion of a title of the web page on which the URL has been written in the main portion or all the texts of the web page; (13) length of the title of the web page on which the URL has been written; (14) number of character strings extracted by a well-known technical term detection engine from the content included in the web page on which the URL has been written; (15) ratio of the number of continuous postings by the same user to the total postings; (16) ratio of the number of postings executed within a predetermined period (e.g., within one hour or within a day) from the most recent posting by the same user to the total postings; (17) number of times of including the URL in a body text of the web page on which the URL has been written; (18) average appearance frequency of the content including the URL; and (19) number of tag appearance times.

Then, in Step S107, the web site determination unit 26 determines a URL where the feature amount calculated in Step S106 satisfies a predetermined condition (e.g., URL where a web site score is equal to or larger than a predetermined value) as a URL of interest. In this processing example, a plurality of URLs are determined as URLs of interest. In this embodiment, a web site corresponding to the URL of interest is referred to as a web site of interest. In other words, in Step S107, the web sites of interest are determined. In Step S108, the web site determination unit 26 sets the URL determined in Step S107 and the web site score corresponding to the URL as a URL of interest and a web site score associated with the URL of interest, respectively, which are included in the correspondence management data 40 generated in Step S103. In this case, as values of the Y evaluation score and the N evaluation score corresponding to the URL of interest, initial values (0 in this embodiment) are set. FIG. 5 illustrates an example of the correspondence management data 40 at the end time of Step S108. As illustrated in FIG. 5, the URLs of interest are associated with each other by the correspondence management data 40. Then, in Step S109, the web determination unit 26 checks whether or not a predetermined condition is satisfied (e.g., whether or not the execution of Step S107 has reached a predetermined number of times, whether or not the number of determined web sites of interest is equal to or larger than a predetermined number, whether or not under the condition that Step S107 is executed a plurality of times, a difference between the number of web sites of interest determined during last execution and the number of web sites of interest determined during current execution is equal to or smaller than a predetermined number, or whether or not under the condition that Step S107 is executed a plurality of times, a difference between web site scores of the web sites of interest determined during last execution and web site scores of the web sites of interest determined during current execution is equal to or smaller than a predetermined value). Under the condition that the predetermined condition is satisfied ("Y" in Step S109), the processing of this example is ended.

Under the condition that the predetermined condition is not satisfied ("N" in Step S109), in Step S110, the data acquisition unit 22 acquires, from the social media system 12, at least one content satisfying a condition that at least one of the URLs of interest is included. In Step S111, the user determination unit 24 determines a user ID associated with the content acquired in Step S110. In this processing example, a plurality of user IDs are determined. In Step S112, the user feature amount calculation unit 30 calculates a feature amount corresponding to each user identified by the user ID determined in Step S111 based on the at least one content acquired in Step S110. Hereinafter, the feature amount thus calculated is referred to as a user feature amount. In this embodiment, the user feature amount calculation unit 30 calculates a value obtained by multiplying values of a plurality of parameters by given weight coefficients to total the multiplied values as a score indicating the feature amount (in this processing example, referred to as a user score). The user feature amount calculation unit 30 may calculate, for example, a vector whose components are the values of the plurality of parameters as a user feature amount.

Parameters that are bases for user score calculation include, for example: (1) number of URLs of interest included in the content posted by the user; (2) number of times of writing URLs of interest per day in the content posted by the user; (3) number of tags used for one posting in the content posted by the user; (4) number of postings per day by the user; (5) number of times of referring to the content posted by the user by other users; (6) number of users following the user on Twitter; and (7) high or low degree of overlapping between a character string in the content posted by the user and a character string included in a content posted by another user.

Then, in Step S113, the user determination unit 24 determines a user (e.g., user having a user score equal to or larger than a predetermined value) having the feature amount calculated in Step S112 that satisfies a predetermined condition as a new user of interest. In Step S114, the user determination unit 24 updates the correspondence management data 40 so that a user ID of the new user of interest determined in Step S113 and a user score of the user of interest can be set as a user-of-interest ID and a user score associated with the user-of-interest ID which are included in the correspondence management data 40. FIG. 6 illustrates an example of the correspondence management data 40 at the end time of Step S114.

A user not determined as a user of interest in Step S102 may be associated as a newly added user of interest with another user of interest, or the user determined as the user of interest in Step S102 may be de-associated from another user of interest without being determined as a user of interest in Step S113. Then, in Step S115, the user determination unit 24 checks whether or not a predetermined condition is satisfied (e.g., whether or not the execution of Step S113 has reached a predetermined number of times, whether or not the number of determined users of interest is equal to or larger than a predetermined number, whether or not under the condition that Step S113 is executed a plurality of times, a difference between the number of users of interest determined during last execution and the number of users of interest determined during current execution is equal to or smaller than a predetermined number, or whether or not, under the condition that Step S113 is executed a plurality of times, a difference between a user score of the users of interest determined during last execution and a user score of the users of interest determined during current execution is equal to or smaller than a predetermined value). Under the condition that the predetermined condition is satisfied ("Y" in Step S115), the processing of this example is ended.

Under the condition that the predetermined condition is not satisfied ("N" in Step S115), the processing of Step S104 and subsequent steps is executed again. FIG. 7 illustrates an example of the correspondence management data 40 after Step S108 has been executed again.

In this case, a web site not determined as a web site of interest may be associated as a newly added web site of interest to be associated with another web site of interest by the re-execution of Step S107, or the web site determined as the web site of interest may be de-associated from another web site of interest without being determined as a web site of interest by the re-execution of Step S107.

According to this embodiment, the processes described above as an example are executed in parallel based on the plurality of different seed data pieces. Thus, a plurality of correspondence management data pieces 40 having different combinations of user-of-interest IDs and URLs of interest are generated.

According to this embodiment, after the above-mentioned processing has been executed and the plurality of correspondence management data pieces 40 have been generated, when the user of the analysis system 10 logs into the analysis system 10 from the client 16, the web page output unit 34 outputs a top page (not shown) to the client 16. The client 16 that has received the top page displays the top page on the display. The top page includes a link to a field list page 50 illustrated in FIG. 8, a link to a user-of-interest list page 64 illustrated in FIG. 11, and a link to a correspondence display page 74 illustrated in FIG. 13.

Figure 8:
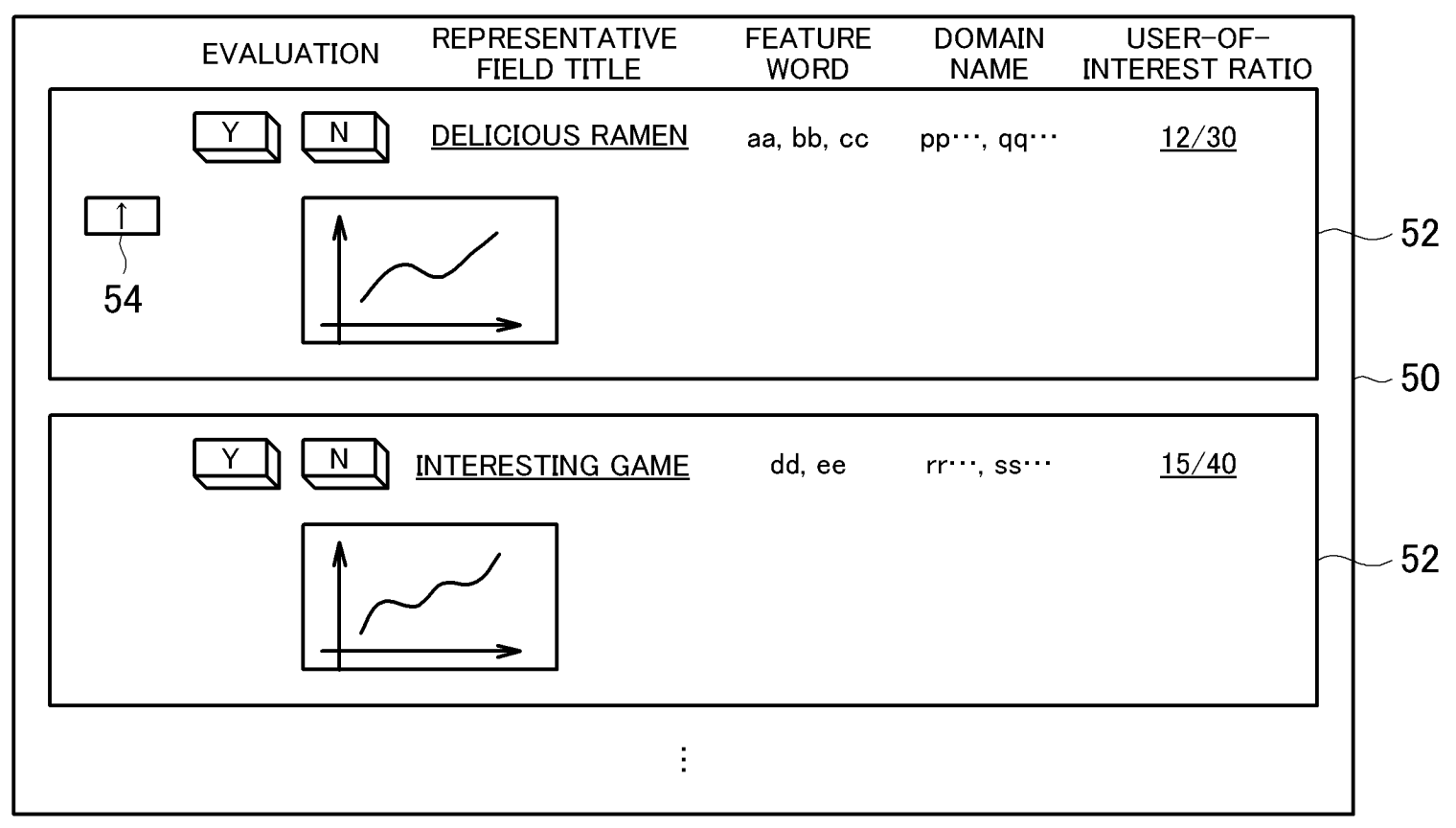

Under the condition that the user clicks the link to the field list page 50, the web page generation unit 32 generates the field list page 50. FIG. 8 illustrates an example of the field list page 50. The field list page 50 includes a plurality of field information arrangement areas 52 respectively corresponding to the correspondence management data pieces 40. The field information arrangement area 52 includes, for example, a Y evaluation button, an N evaluation button, a representative field title, a feature word, a domain name, a user-of-interest ratio, and a posting tendency graph. The representative field title and the user-of-interest ratio are set as links.

The web page generation unit 32 arranges, for example, a character string determined based on web sites locations of which are indicated by URLs of interest included in the correspondence management data 40 (e.g., title of a representative web site selected among web sites at locations indicated by URLs of interest, or phrase most often included as a title of the web site at a location indicated by the URL of interest), as a representative field title in the field information arrangement area 52. Further, the web page generation unit 32 arranges a character string extracted, by morphological analysis, from a text included in a web page constituting a web site at a location indicated by each URL of interest included in the correspondence management data 40 (e.g., character string included in a text, the number of which is equal to or larger than a predetermined number), as a feature word in the field information arrangement area 52. The web page generation unit 32 may arrange a plurality of feature words in the field information arrangement area 52. The web page generation unit 32 arranges a name of a domain to which the web site at the location indicated by the URL belongs, as a domain name in the field information arrangement area 52. The web page generation unit 32 may arrange a plurality of domain names in the field information arrangement area 52. The web page generation unit 32 arranges a ratio of the number of users of interest who have posted contents on which URLs of interest have been written to the total number of users who have posted contents on which URLs of interest have been written, as a user-of-interest ratio in the field information arrangement area 52.

The web page generation unit 32 arranges a graph showing a change, with time, of the number of contents including URLs of interest and posted per unit time as a posting tendency graph in the field information arrangement area 52. The web page generation unit 32 arranges, under the condition that it is determined that a posting tendency calculated based on the posting tendency graph is an increasing tendency (e.g., under the condition that inclination of a regression line is positive, and an absolute value of the inclination is larger than a predetermined value), a tendency graphic 54 indicating that a field is becoming popular (e.g., tendency graphic 54 indicating an upward arrow) in the field information arrangement area 52. The web page generation unit 32 arranges, under the condition that it is determined that a posting tendency calculated based on the posting tendency graph is a decreasing tendency (e.g., under the condition that inclination of a regression line is negative, and an absolute value of the inclination is larger than a predetermined value), a tendency graphic 54 indicating that a field is becoming less popular (e.g., tendency graphic 54 indicating a downward arrow) in the field information arrangement area 52.

The field list page 50 is accordingly generated. The web page output unit 34 outputs the generated field list page 50 to the client 16. The client 16 that has received the field list page 50 displays the field list page 50 on the display.

According to this embodiment, the user of the analysis system 10 is instructed to click the Y evaluation button under the condition that evaluating that useful information has been acquired, and to click the N evaluation button under the condition that evaluating that useful information has not been acquired. Under the condition that the user clicks the Y evaluation button arranged in the field information arrangement area 52, the web page generation unit 32 increments a value of a Y evaluation score corresponding to the correspondence management data 40 by 1 in the correspondence management data 40 corresponding to the Y evaluation button. On the other hand, under the condition that the user clicks the N evaluation button arranged in the field information arrangement area 52, the web page generation unit 32 increments a value of an N evaluation score corresponding to the correspondence management data 40 by 1 in the correspondence management data 40 corresponding to the N evaluation button.

Figure 9:
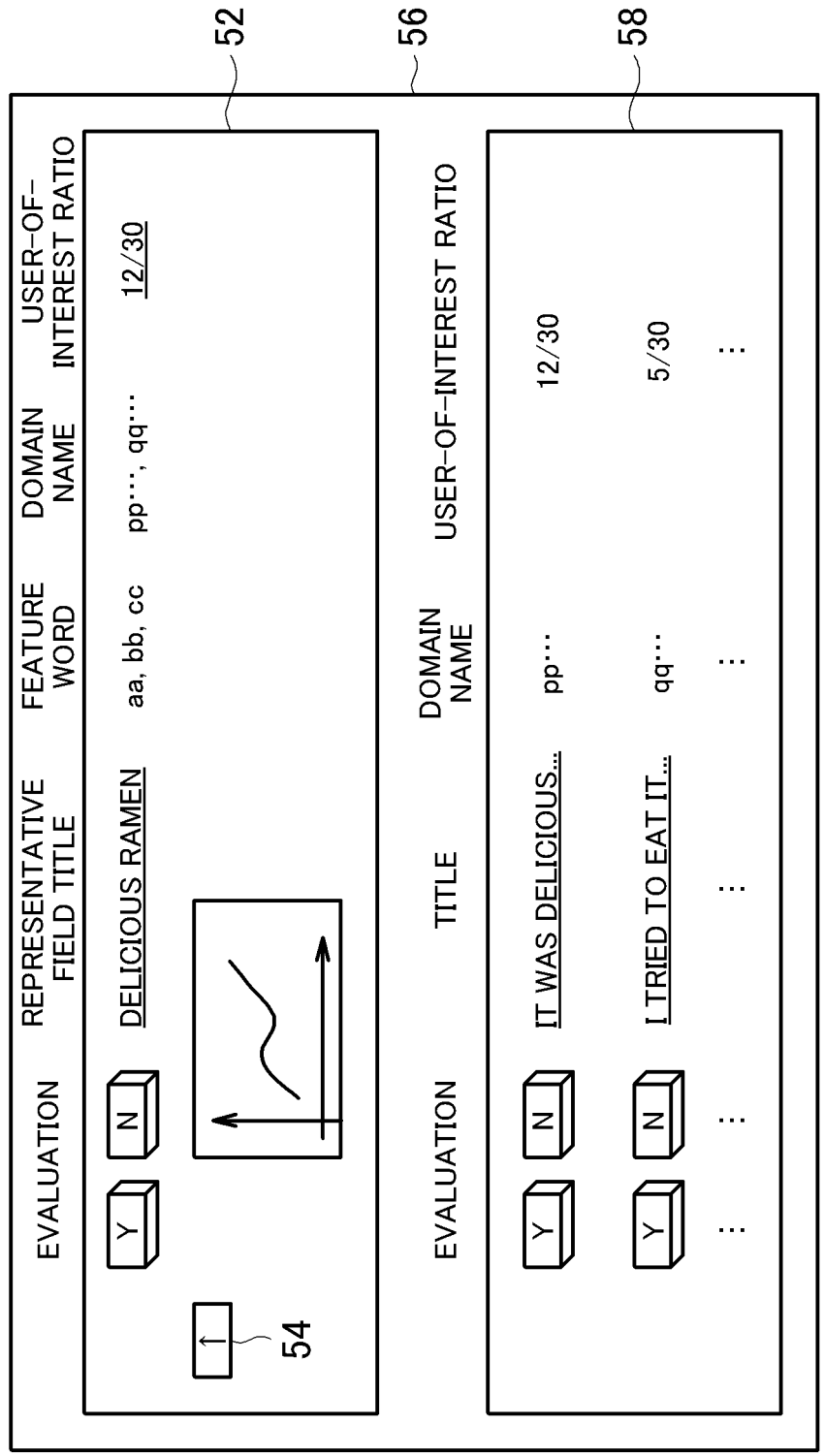
FIG. 9 illustrates an example of a detailed field page.

Under the condition that the user clicks the representative field title arranged in the field information arrangement area 52, the web page generation unit 32 generates a detailed field page 56 illustrated in FIG. 9 as an example. The detailed field page 56 is a web page generated based on the correspondence management data 40 corresponding to the clicked representative field title. The detailed field page 56 includes a field information arrangement area 52 and a detailed field information arrangement area 58. In the field information arrangement area 52, information included in the field information arrangement area 52 corresponding to the clicked representative field title in the field list page 50 is arranged. In the detailed field information arrangement area 58, at least one combination of a Y evaluation button, an N evaluation button, a title, a domain name, and a user-of-interest ratio is arranged. Each combination corresponds, one to one, to the URL of interest included in the correspondence management data 40 corresponding to the clicked representative field title. The user-of-interest ratio arranged in the field information arrangement area 52 and the title arranged in the detailed field information arrangement area 58 are set as links.

The web page generation unit 32 arranges, for example, for each URL of interest included in the correspondence management data 40, a title of a web site at a location indicated by the URL of interest in the detailed field information arrangement area 58, a name of a domain of the web site at the location indicated by the URL of interest as a domain name in the detailed field information arrangement area 58, and a ratio of the number of users of interest who have posted contents including the URLs of interest to the total number of users who have posted contents including the URLs of interest in the detailed field information arrangement area 58.

The detailed field page 56 is accordingly generated. The web page output unit 34 outputs the generated detailed field page 56 to the client 16. The client 16 that has received the detailed field page 56 displays the detailed field page 56 on the display.

Also in the detailed field page 56, under the condition that the user clicks the Y evaluation button arranged in the field information arrangement area 52, the web page generation unit 32 increments a value of a Y evaluation score corresponding to the correspondence management data 40 by 1 in the correspondence management data 40 corresponding to the Y evaluation button. On the other hand, also in the detailed field page 56, under the condition that the user clicks the N evaluation button arranged in the field information arrangement area 52, the web page generation unit 32 increments a value of an N evaluation score corresponding to the correspondence management data 40 by 1 in the correspondence management data 40 corresponding to the N evaluation button.

Under the condition that the user clicks the Y evaluation button arranged in the detailed field information arrangement area 58, the web page generation unit 32 increments a value of a Y evaluation score corresponding to the URL of interest corresponding to the clicked Y evaluation button by 1 in the correspondence management data 40 corresponding to the detailed field page 56. On the other hand, under the condition that the user clicks the N evaluation button arranged in the detailed field information arrangement area 58, the web page generation unit 32 increments a value of an N evaluation score corresponding to the URL of interest corresponding to the clicked N evaluation button by 1 in the correspondence management data 40 corresponding to the detailed field page 56.

A title arranged in the detailed field information arrangement area 58 is a link to a web page determined by a URL corresponding to the title. Under the condition that the user clicks the title, the web page determined by the URL corresponding to the title is displayed on the display of the client 16.

Figure 10:
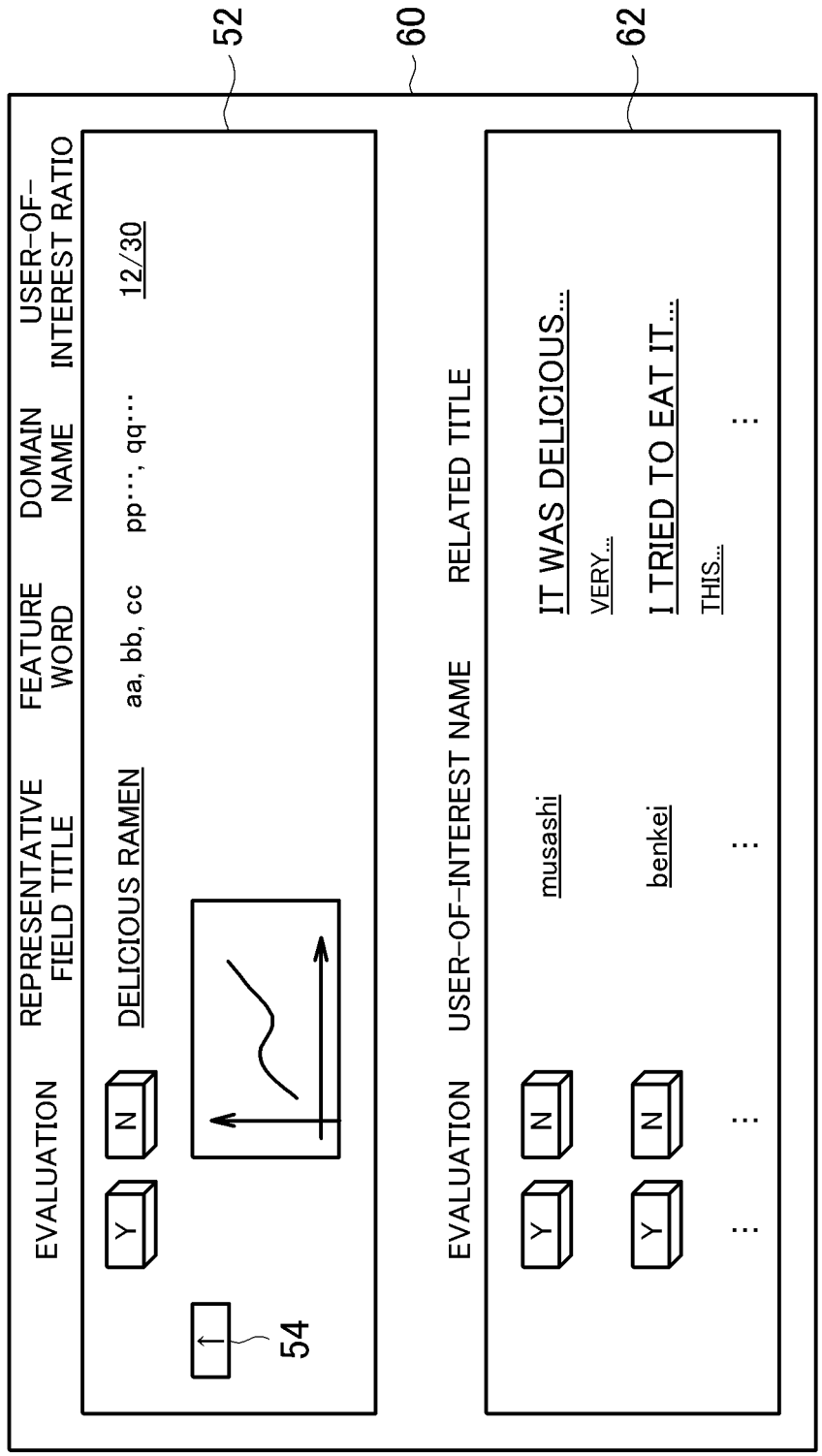
FIG. 10 illustrates an example of a field associated user-of-interest list page.

Under the condition that the user clicks the user-of-interest ratio arranged in the field information arrangement area 52 included in the field list page 50, or the user-of-interest ratio arranged in the field information arrangement area 52 included in the detailed field page 56, the web page generation unit 32 generates a field associated user-of-interest list page 60 illustrated in FIG. 10 as an example. The field associated user-of-interest list page 60 is a web page generated based on the correspondence management data 40 corresponding to the clicked user-of-interest ratio. The field associated user-of-interest list page 60 includes a field information arrangement area 52 and a field associated user-of-interest information arrangement area 62. In the field information arrangement area 52, information included in the field information arrangement area 52 corresponding to the clicked user-of-interest ratio (information similar to that arranged in the field information arrangement area 52 included in the field list page 50 illustrated in FIG. 8) is arranged. In the field associated user-of-interest information arrangement area 62, at least one combination of a Y evaluation button, an N evaluation button, a user-of-interest name, and a related title is arranged. Each combination corresponds, one to one, to a user-of-interest ID included in the correspondence management data 40 corresponding to the clicked user-of-interest ratio. The representative field title arranged in the field information arrangement area 52 and the user-of-interest name and the related title arranged in the field associated user-of-interest information arrangement area 62 are set as links.

The web page generation unit 32 arranges, for example, for each user-of-interest ID included in the correspondence management data 40 corresponding to the field associated user-of-interest list page 60, a user name determined based on the user-of-interest ID as a user-of-interest name in the field associated user-of-interest information arrangement area 62, and a title of a web site at a location indicated by a URL, which is included in a content posted by a user determined based on the user-of-interest ID and is a URL of interest included in any one of the correspondence management data pieces 40 as a related title in the field associated user-of-interest information arrangement area 62. In this case, the web page generation unit 32 can arrange the user-of-interest ID as a user-of-interest name in the field associated user-of-interest information arrangement area 62. Further, under the condition that a plurality of URLs of interest included in the content posted by the user determined based on the user-of-interest ID are determined, the web page generation unit 32 may arrange a plurality of titles as related titles in the field associated user-of-interest information arrangement area 62.

According to this embodiment, a title of a web site at a location indicated by a URL of interest other than the URL of interest included in the correspondence management data 40 corresponding to the field associated user-of-interest list page 60 is also arranged as a related title in the field associated user-of-interest information arrangement area 62. In this embodiment, a title of a web page determined by the URL of interest included in the correspondence management data 40 corresponding to the field information arrangement area 52 included in the field associated user-of-interest list page 60 is emphasized, for example, by being represented by a bolder font than those for the other titles, or larger than the other titles.

The field associated user-of-interest list page 60 is accordingly generated. The web page output unit 34 outputs the generated field associated user-of-interest list page 60 to the client 16. The client 16 that has received the field associated user-of-interest list page 60 displays the field associated user-of-interest list page 60 on the display.

Also in the field associated user-of-interest list page 60, under the condition that the user clicks the Y evaluation button arranged in the field information arrangement area 52, the web page generation unit 32 increments a value of a Y evaluation score corresponding to the correspondence management data 40 by 1 in the correspondence management data 40 corresponding to the Y evaluation button. On the other hand, also in the field associated user-of-interest list page 60, under the condition that the user clicks the N evaluation button arranged in the field information arrangement area 52, the web page generation unit 32 increments a value of an N evaluation score corresponding to the correspondence management data 40 by 1 in the correspondence management data 40 corresponding to the N evaluation button.

Under the condition that the user clicks the Y evaluation button arranged in the field associated user-of-interest information arrangement area 62, the web page generation unit 32 increments a value of a Y evaluation score corresponding to the user-of-interest ID corresponding to the clicked Y evaluation button by 1 in the correspondence management data 40 corresponding to the field associated user-of-interest list page 60. On the other hand, under the condition that the user clicks the N evaluation button arranged in the field associated user-of-interest information arrangement area 62, the web page generation unit 32 increments a value of an N evaluation score corresponding to the user-of-interest ID corresponding to the clicked N evaluation button by 1 in the correspondence management data 40 corresponding to the field associated user-of-interest list page 60.

A user-of-interest name arranged in the field associated user-of-interest information arrangement area 62 is a link to a web page representing a user determined by the user-of-interest name (for example, page of a blog). Under the condition that the user clicks the user-of-interest name, the web page representing the user determined by the user-of-interest name is displayed on the display of the client 16. A related title arranged in the field associated user-of-interest information arrangement area 62 is a link to a web page determined by a URL corresponding to the related title. Under the condition that the user clicks the related title, the web page determined by the URL corresponding to the related title is displayed on the display of the client 16.

Also in the field associated user-of-interest list page 60, under the condition that the user clicks the representative field title arranged in the field information arrangement area 52, the web page generation unit 32 generates a detailed field page 56 corresponding to the representative field title. As a result, the detailed field page 56 is displayed on the display of the client 16.

Figure 11:
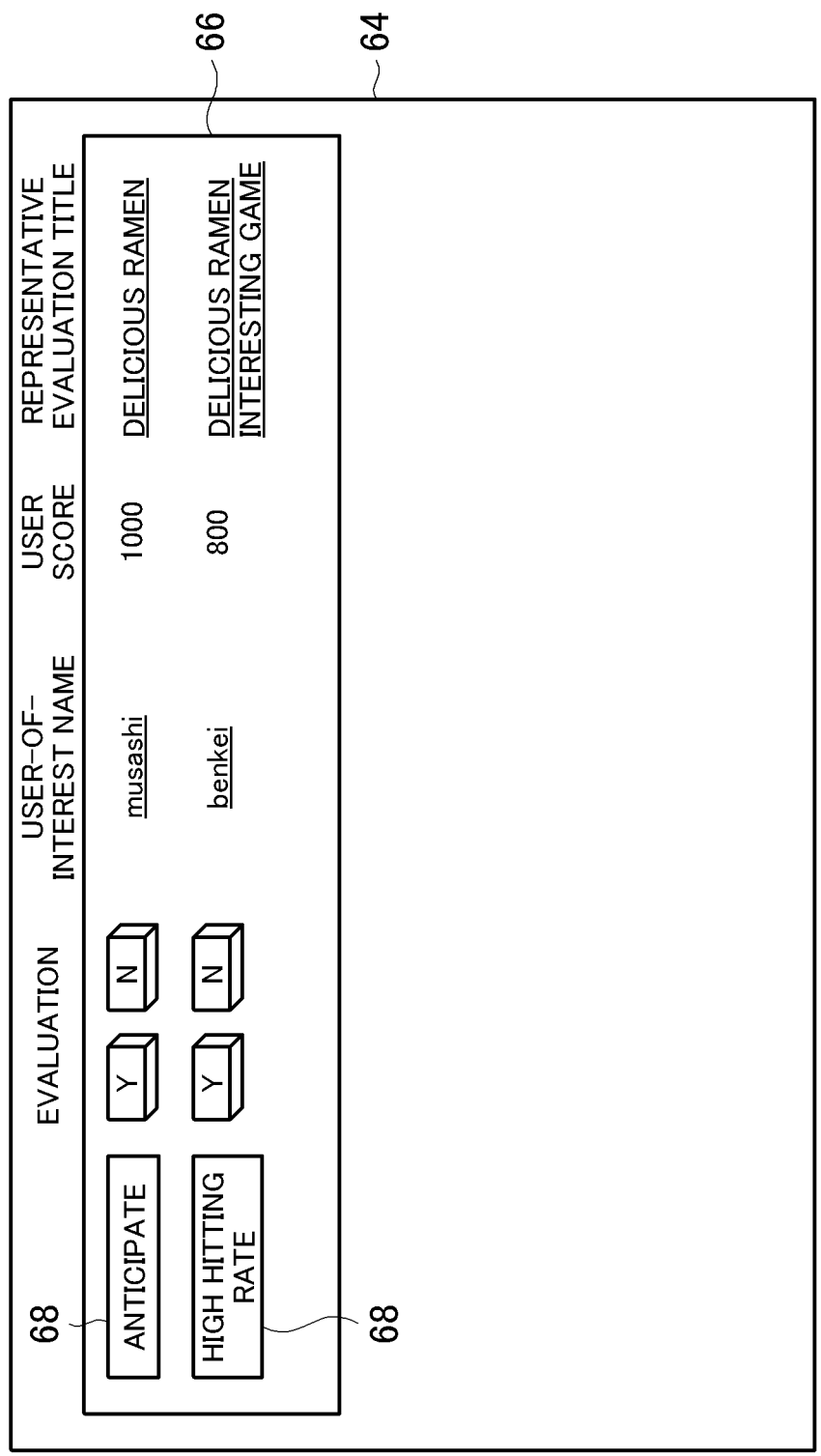
FIG. 11 illustrates an example of a user-of-interest list page.

Under the condition that the user clicks the link to the user-of-interest list page 64 included in the top page, the web generation unit 32 generates a user-of-interest list page 64. FIG. 11 illustrates an example of the user-of-interest list page 64. The user-of-interest list page 64 is a web page indicating a list of users corresponding to the user-of-interest IDs included in any one of the correspondence management data pieces 40 stored in the data storage unit 20. The user-of-interest list page 64 includes a user-of-interest information arrangement area 66. In the user-of-interest information arrangement area 66, at least one combination of a Y evaluation button, an N evaluation button, a user-of-interest name, a user score, and a representative evaluation title is included. Each combination corresponds, one to one, to the user-of-interest ID included in one of the correspondence management data 40. The user-of-interest name and the representative evaluation title arranged in the user-of-interest information arrangement area 66 are set as links.

The web page generation unit 32 arranges, for example, for each user-of-interest ID included in any one of the correspondence management data pieces 40, a user name determined based on the user-of-interest ID as a user-of-interest name in the user-of-interest information arrangement area 66, a user score of a user determined based on the user-of-interest ID in the user-of-interest information arrangement area 66, and a representative field title corresponding to the correspondence management data 40 including the user-of-interest ID where a value of a Y evaluation score corresponding to the correspondence management data 40 is equal to or larger than a predetermined value (e.g., 1) as a representative evaluation title in the user-of-interest information arrangement area 66. In this case, the web page generation unit 32 may arrange the user-of-interest ID as a user-of-interest name in the user-of-interest information arrangement area 66. Further, under the condition that a plurality of representative evaluation titles are determined, the web page generation unit 32 may arrange the plurality of representative evaluation titles in the user-of-interest information arrangement area 66.

According to this embodiment, the web page generation unit determines a posting tendency of the user of interest corresponding to the user-of-interest name (e.g., content including the URL of interest tends to be posted earlier than that of the other user before a peak of the number of posted contents including the URL of interest per unit time is reached (prior reading), or a ratio of inclusion of the URL of interest in a content to be posted is high (high hitting rate)), and arranges a user posting tendency graph 68 indicating the posting tendency in a position corresponding to the corresponding user-of-interest name (e.g., left side of the corresponding user-of-interest name).

The user-of-interest list page 64 is accordingly generated. The web page output unit 34 outputs the generated user-of-interest list page 64 to the client 16. The client 16 that has received the user-of-interest list page 64 displays the user-of-interest list page 64 on the display.

According to this embodiment, under the condition that the user-of-interest list page 64 is generated, the web page generation unit 32 generates, for each user of interest corresponding to a user-of-interest name included in the user-of-interest list page 64, user evaluation management data including a user-of-interest ID, a Y evaluation score having an initial value set to 0, and an N evaluation score having an initial value set to 0, and stores the user evaluation management data in the data storage unit 20. In this case, the web page generation unit 32 generates no user evaluation management data concerning the user evaluation management data already stored in the data storage unit 20.

Under the condition that the user clicks the Y evaluation button arranged in the user-of-interest information arrangement area 66, the web page generation unit 32 increments a value of a Y evaluation score included in the user evaluation management data corresponding to the corresponding user-of-interest ID by 1. On the other hand, under the condition that the user clicks the N evaluation button arranged in the user-of-interest information arrangement area 66, the web page generation unit 32 increments a value of an N evaluation score included in the user evaluation management data corresponding to the corresponding user-of-interest ID by 1.

Under the condition that the user clicks a representative evaluation title arranged in the user-of-interest information arrangement area 66, the web page generation unit 32 generates the detailed field page 56 corresponding to the representative evaluation title. As a result, the detailed field page 56 is displayed on the display of the client 16.

Under the condition that the user clicks a user-of-interest name arranged in the user-of-interest information arrangement area 66, the web page generation unit 32 generates a detailed user-of-interest page 70 illustrated in FIG. 12 as an example. The detailed user-of-interest page 70 is a web page generated based on a user-of-interest ID corresponding to the clicked user-of-interest name. The detailed user-of-interest page 70 includes a user-of-interest information arrangement area 66 and a detailed user-of-interest information arrangement area 72. In the user-of-interest information arrangement area 66, combination of a Y evaluation button, an N evaluation button, a user-of-interest name, a user score, and at least one representative evaluation title is included. In the detailed user-of-interest information arrangement area 72, at least one combination of a Y evaluation button, an N evaluation button, a representative field title, and a title is included. Each combination corresponds, one to one, to the correspondence management data 40 including the user-of-interest ID corresponding to the clicked user-of-interest name. The user-of-interest name and the representative evaluation title arranged in the user-of-interest information arrangement area 66 and the representative field title and the title arranged in the detailed user-of-interest information arrangement area 72 are set as links.

The web page generation unit 32 arranges, for example, for each correspondence management data 40 including the user-of-interest ID corresponding to the clicked user-of-interest name, a representative field title corresponding to the correspondence management data 40 and a title of a web page corresponding to the URL of interest included in the correspondence management data 40 in the detailed user-of-interest information arrangement area 72. In this case, under the condition that the correspondence management data 40 includes a plurality of URLs of interest, the web page generation unit 32 may arrange a plurality of titles in the detailed user-of-interest information arrangement area 72.

The detailed user-of-interest page 70 is accordingly generated. The web page output unit 34 outputs the generated detailed user-of-interest page 70 to the client 16. The client 16 that has received the detailed user-of-interest page 70 displays the detailed user-of-interest page 70 on the display.

In the detailed user-of-interest page 70, under the condition that the user clicks the Y evaluation button arranged in the user-of-interest information arrangement area 66, the web page generation unit 32 increments a value of a Y evaluation score included in the user evaluation management data corresponding to the corresponding user-of-interest ID by 1. On the other hand, in the detailed user-of-interest page 70, under the condition that the user clicks the N evaluation button arranged in the user-of-interest information arrangement area 66, the web page generation unit 32 increments a value of an N evaluation score included in the user evaluation management data corresponding to the corresponding user-of-interest ID by 1.

Under the condition that the user clicks the Y evaluation button arranged in the detailed user-of-interest information arrangement area 72, the web page generation unit 32 increments a value of a Y evaluation score corresponding to the user-of-interest ID corresponding to the detailed user-of-interest page 70 by 1 in the correspondence management data 40 corresponding to the Y evaluation button. On the other hand, under the condition that the user clicks the N evaluation button arranged in the detailed user-of-interest information arrangement area 72, the web page generation unit 32 increments a value of an N evaluation score corresponding to the user-of-interest ID corresponding to the detailed user-of-interest page 70 by 1 in the correspondence management data 40 corresponding to the N evaluation button.

A user-of-interest name arranged in the user-of-interest information arrangement area 66 is a link to a web page representing a user determined by the user-of-interest name (e.g., page of a blog). Under the condition that the user clicks the user-of-interest name, the web page representing the user determined by the user-of-interest name is displayed on the display of the client 16. Under the condition that the user clicks the representative evaluation title arranged in the user-of-interest information arrangement area 66, the web page generation unit 32 generates a detailed field page 56 corresponding to the representative evaluation title. As a result, the detailed field page 56 is displayed on the display of the client 16.

In the detailed user-of-interest page 70, under the condition that the user clicks the representative field title arranged in the field information arrangement area 52, the web generation unit generates a detailed field page 56 corresponding to the representative field title. As a result, the detailed field page 56 is displayed on the display of the client 16.

Under the condition that the user clicks the representative field title arranged in the detailed user-of-interest information arrangement area 72, the web page generation unit 32 generates a detailed field page 56 corresponding to the representative field title. As a result, the detailed field page 56 is displayed on the display of the client 16. A title arranged in the detailed user-of-interest information arrangement area 72 is a link to a web page determined by a URL corresponding to the title. Under the condition that the user clicks the title, the web page determined by the URL corresponding to the title is displayed on the display of the client 16.

Under the condition that the user clicks a link to a correspondence display page 74 included in the top page, the web page generation unit 32 generates the correspondence display page 74. FIG. 13 illustrates an example of the correspondence display page 74. In the correspondence display page 74, a user-of-interest image 76 corresponding to each user of interest is arranged on the left side, and a web-site-of-interest image 78 corresponding to each web site of interest is arranged on the right side. In this embodiment, the user-of-interest image 76 is, for example, an image of an icon of a face, and the web-site-of-interest image 78 is, for example, a screen-shot image of a web page representing a web site of interest corresponding to the web-site-of-interest image 78 (e.g., web page having an address indicated by a URL of interest corresponding to the web site of interest). On the left side of each user-of-interest image 76, a bar graph indicating a size of a value of a parameter that becomes a basis for calculating a user score of the user of interest corresponding to the user-of-interest image 76 is arranged. On the right side of each web-site-of-interest image 78, a bar graph indicating a size of a value of a parameter that becomes a basis for calculating a web site score of the web site of interest corresponding to the web-site-of-interest image 78, and a graph indicating a change, with time, of the number of posted contents per unit time including a URL of interest corresponding to the web-site-of-interest image 78 are arranged.

According to this embodiment, the user-of-interest image 76 is displayed in a manner in accordance with the user score of the user of interest corresponding to the user-of-interest image 76. For example, the web page generation unit 32 arranges each user-of-interest image 76 in the correspondence display page 74 so that a size of the user-of-interest image 76 can be larger as the user score of the user of interest corresponding to the user-of-interest image 76 is larger. According to this embodiment, the web-site-of-interest image 78 is displayed in a manner in accordance with the web site score of the web site of interest corresponding to the web-site-of-interest image 78. For example, the web page generation unit 32 arranges each web-site-of-interest image 78 in the correspondence display page 74 so that a size of the web-site-of-interest image 78 can be larger as the web site score of the web site of interest corresponding to the web-site-of-interest image 78 is larger. The web page generation unit 32 may arrange a user-of-interest image 76 of a color corresponding to the user score of the corresponding user of interest in the correspondence display page 74. The web page generation unit 32 may arrange a web-site-of-interest image 78 of a color corresponding to the web site score of the corresponding web site of interest in the correspondence display page 74.

The web page generation unit 32 arranges information indicating a strength of a relationship between the user-of-interest image 76 and the web-site-of-interest image 78 (in the example illustrated in FIG. 13, a relation line 80 that is a line connecting the user-of-interest image 76 and the web-site-of-interest image 78) in the correspondence display page 74 in a display form in accordance with information relating to the web site of interest corresponding to the web-site-of-interest image 78, the information being registered by the user of interest corresponding to the user-of-interest image 76. According to this embodiment, for example, the web site generation unit 32 arranges the relation line 80 connecting the user-of-interest image 76 and the web-site-of-interest image 78 in the correspondence display page 74 so that, as a user of interest is earlier in order of posting a content including a URL of interest corresponding to the web site of interest, the relation line 80 connecting the web-site-of-interest image 78 corresponding to the web site of interest and the user-of-interest image 76 corresponding to the user of interest can be thicker, and that, as reaction to the content posted by the user of interest and including the URL of interest corresponding to the web site of interest is larger (e.g., number of posted comments or responses to the content is larger, or number of retweets concerning the content by the Twitter is larger), a color of the relation line 80 connecting the web-site-of-interest image 78 corresponding to the web site of interest and the user-of-interest image 76 corresponding to the user of interest can be darker.

According to this embodiment, display forms (e.g., background colors) of the field information arrangement area 52, the detailed field information arrangement area 58, the field associated user-of-interest information arrangement area 62, the user-of-interest information arrangement area 66, and the detailed user-of-interest information arrangement area 72 are different from one another. According to this embodiment, the background colors of the field information arrangement area 52 and the detailed field information arrangement area 58 are warm colors, and the background colors of the field associated user-of-interest information arrangement area 62, the user-of-interest information arrangement area 66, and the detailed user-of-interest information arrangement area 72 are cold colors.

The analysis system 10 can perform various processes (e.g., analysis of evaluation of the user of interest or evaluation of the web site of interest) based on the Y evaluation score and the N evaluation score described above.

The analysis system 10 may execute, for example, under the condition that the value of the Y evaluation score or the value of the N evaluation score included in the evaluation management data satisfies a predetermined condition (e.g., total value exceeds 100), the processing of the above-mentioned example again by using the value of the Y evaluation score or the value of the N evaluation score included in the evaluation management data as a value of a parameter that becomes a basis for calculating the user feature amount or the web site feature amount. The analysis system 10 may determine an ID of interest or a URL of interest based on, for example, a user score or a web site score corrected by adding the value of the Y evaluation score to the user score or the web site score calculated in the processing example and subtracting the value of the N evaluation score.

Further, for example, the analysis system 10 may set or change the condition in Step S107 or Step S113 by learning a size relationship between the Y evaluation score and the N evaluation score included in the evaluation management data by a well-known learning technology.

According to this embodiment, as described above, a user group including a plurality of users of interest and a web page group including a plurality of web pages are associated with each other based on the correspondence management data 40.

The present invention is not limited to the above-mentioned embodiment.

For example, the analysis system 10 may repeatedly execute, based on the same seed data, the processing of the above-mentioned example at predetermined time intervals to generate correspondence management data pieces 40 different from one another.

The analysis system 10 may delete, under the condition that a predetermined condition that the value of the N evaluation score is larger than that of the Y evaluation score by a predetermined amount or a given multiple in the evaluation management data corresponding to the user-of-interest ID or the URL of interest, the user-of-interest ID included in the corresponding correspondence management data 40, the user score corresponding to the user-of-interest ID, the Y evaluation score corresponding to the user-of-interest ID, and the N evaluation score corresponding to the user-of-interest ID, or the URL of interest, the web site score corresponding to the URL of interest, the Y evaluation score corresponding to the URL of interest, and the N evaluation score corresponding to the URL of interest. The analysis system 10 may delete, under the condition that a predetermined condition that the value of the N evaluation score is larger than that of the Y evaluation score by a predetermined amount or a given multiple in the evaluation management data corresponding to the correspondence management data 40, the corresponding correspondence management data 40 from the data storage unit 20.

For example, as a parameter that becomes a basis for calculating a user feature amount, a user's posting tendency (e.g., content including the URL of interest tends to be posted earlier than that of the other user before a peak of the number of posted contents including the URL of interest per unit time is reached (prior reading), or a ratio of inclusion of the URL of interest in a content to be posted is high (high hitting rate)) may be used.

As a condition indicated by the seed data, a condition concerning the user (e.g., condition that a content posted based on the user ID of the user who tends to post the content including the URL of interest earlier than that of the other user before a peak of the number of posted contents including the URL of interest per unit time is reached is included in the web page) may be set.

Between the processing of Step S102 and Step S103, the user feature amount calculation unit 30 may calculate a user feature amount corresponding to the user of interest determined in Step S102. During the processing of Step S103 or Step S104, a user having a calculated user feature amount that satisfies a predetermined condition may be regarded as a user of interest.

There is no need to store any seed data in the data storage unit 20 beforehand. In Step S101, the data acquisition unit 22 may acquire all obtainable web pages from the social media system 12.

According to this embodiment, the web site only needs to be a digital content or a set of digital contents made public in a computer network such as the Internet. The web site is not limited to a web page (e.g., one or a plurality of web pages corresponding to URL started with "http: //" or one or a plurality of web pages to be accessed by HTTP protocol).

The roles of the analysis system 10, the social media system 12, and the client 16 according to this embodiment are not limited to those described above. The above-mentioned specific character strings and the specific character strings in the drawings are only examples, and thus the present invention is not limited thereto.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An information processing system, comprising:
    a data acquisition unit operating to: (i) search one or more web sites on a network, where the one or more web sites permit a plurality of users to post content onto the web sites in order to make such content publically available over the network, and (ii) acquire certain of the content posted by the users that satisfy one or more search criteria;
    a user determination unit operating to analyze the acquired content and obtain user identification information as to each of the plurality of users who posted the acquired content, where each of the plurality of users is deemed to be among a group of users of interest;
    a web site determination unit operating to determine one or more web sites referenced in at least one of the acquired content and further content posted by any of the users of interest, such that the one or more determined web sites are associated with the users of interest; and
    a web site association unit operating to: (i) determine respective numbers of the users of interest who referenced respective ones of the determined web sites in the acquired and/or further content; (ii) determine which of the respective numbers satisfy a predetermined condition; and (iii) associate a plurality of the determined web sites with one another for which the respective numbers thereof satisfy the predetermined condition.

2. The information processing system according to claim 1, wherein, the predetermined condition is whether a given one of the respective numbers is equal to or larger than a predetermined number.

3. The information processing system according to claim 1, wherein the predetermined condition is whether a ratio of a given one of the respective numbers to a total number of the users of interest is equal to or larger than a predetermined value.

4. The information processing system according to claim 1, wherein the user determination unit determines, among users associated with any one of the plurality of the web sites associated with each other by the web site association unit, a user who satisfies a condition on a feature amount of the user.

5. The information processing system according to claim 1, wherein the user determination unit determines at least a part of users associated with any one of the plurality of the web sites associated with each other by the web site association unit as a user of interest to be added;
    wherein the web site determination unit determines a web site associated with any one of the users of interest including the at least the part of users determined as the user of interest to be added; and
    further comprising a web site de-association unit that de-associates a web site no longer satisfying the predetermined condition.

6. The information processing system according to claim 1, wherein:
    respective uniform resource locators (URLs) of each of the plurality of the determined web sites that are associated with one another are provided on a web page for users to access; and
    the web site association unit operates to: (i) determine respective numbers of user accesses to each of the URLs; (ii) determine which of the respective numbers of user accesses satisfies an increasing tendency metric;

and (iii) further associate one or more of the plurality of the determined web sites with one another where the increasing tendency metric is satisfied.

7. An information processing system, comprising:
a data acquisition unit operating to: (i) search one or more web sites on a network, where the one or more web sites permit a plurality of users to post content onto the web sites in order to make such content publically available over the network, and (ii) acquire certain of the content posted by the users that satisfy one or more search criteria;
a user determination unit operating to analyze the acquired content and obtain user identification information as to each of the plurality of users who posted the acquired content, where each of the plurality of users is deemed to be among a group of users of interest;
a web site determination unit operating to determine one or more web sites referenced in at least one of the acquired content and further content posted by any of the users of interest; and
a web site association unit operating to determine one or more indicators of a strength of relationship between each of the users of interest who referenced respective ones of the determined web sites in the acquired and/or further content;
an information generation unit that generates information to be provided including information corresponding to each of a plurality of users of interest, information corresponding to each of a plurality of web sites of interest, and information indicating the strength of a relationship between the each of the plurality of users of interest and the each of the plurality of web sites of interest; and
an information output unit that outputs the information to be provided, wherein:
the each of the plurality of web sites of interest comprises a web site associated with information registered by any one of the plurality of users of interest; and
the information generation unit generates the information to be provided so that the information indicating the strength of the relationship between the user of interest and the web site of interest is displayed in a manner in accordance with the information relating to the web site of interest, the information being registered by the user of interest.

8. An information processing method, comprising:
searching one or more web sites on a network, where the one or more web sites permit a plurality of users to post content onto the web sites in order to make such content publically available over the network;
acquiring certain of the content posted by the users that satisfy one or more search criteria;
analyzing the acquired content and obtain user identification information as to each of the plurality of users who posted the acquired content, where each of the plurality of users is deemed to be among a group of users of interest;
determining one or more web sites referenced in at least one of the acquired content and further content posted by any of the users of interest, such that the one or more determined web sites are associated with the users of interest;
determining respective numbers of the users of interest who referenced respective ones of the determined web sites in the acquired and/or further content;
determining which of the respective numbers satisfy a predetermined condition; and
associating a plurality of the determined web sites with one another for which the respective numbers thereof satisfy the predetermined condition.

9. A program stored in a non-transitory computer readable information storage medium, which is to be executed by a computer, the program including instructions to:
search one or more web sites on a network, where the one or more web sites permit a plurality of users to post content onto the web sites in order to make such content publically available over the network;
acquire certain of the content posted by the users that satisfy one or more search criteria;
analyze the acquired content and obtain user identification information as to each of the plurality of users who posted the acquired content, where each of the plurality of users is deemed to be among a group of users of interest;
determine one or more web sites referenced in at least one of the acquired content and further content posted by any of the users of interest, such that the one or more determined web sites are associated with the users of interest;
determine respective numbers of the users of interest who referenced respective ones of the determined web sites in the acquired and/or further content;
determine which of the respective numbers satisfy a predetermined condition; and
associate a plurality of the determined web sites with one another for which the respective numbers thereof satisfy the predetermined condition.

10. A non-transitory computer readable information storage medium storing a program which is to be executed by a computer, the program including instructions to:
search one or more web sites on a network, where the one or more web sites permit a plurality of users to post content onto the web sites in order to make such content publically available over the network;
acquire certain of the content posted by the users that satisfy one or more search criteria;
analyze the acquired content and obtain user identification information as to each of the plurality of users who posted the acquired content, where each of the plurality of users is deemed to be among a group of users of interest;
determine one or more web sites referenced in at least one of the acquired content and further content posted by any of the users of interest, such that the one or more determined web sites are associated with the users of interest;
determine respective numbers of the users of interest who referenced respective ones of the determined web sites in the acquired and/or further content;
determine which of the respective numbers satisfy a predetermined condition; and
associate a plurality of the determined web sites with one another for which the respective numbers thereof satisfy the predetermined condition.

* * * * *